United States Patent [19]

Hachinoda

[11] Patent Number: 5,168,370
[45] Date of Patent: Dec. 1, 1992

[54] PRINTER CAPABLE OF PRINTING AT REGULAR TIME INTERVALS

[75] Inventor: Masayuki Hachinoda, Nara, Japan

[73] Assignee: Sharp Kabushiki Kaisha, Osaka, Japan

[21] Appl. No.: 501,081

[22] Filed: Mar. 29, 1990

[30] Foreign Application Priority Data

Apr. 5, 1989 [JP] Japan .................................. 1-87500

[51] Int. Cl.⁵ ...................... H04N 1/23; G01D 15/10; B41J 2/355
[52] U.S. Cl. ................................ 358/296; 346/76 PH
[58] Field of Search .............. 358/296, 401, 476; 346/76 PH; 400/120

[56] References Cited

FOREIGN PATENT DOCUMENTS 58-138169 8/1983 Japan .

Primary Examiner—Benjamin R. Fuller
Assistant Examiner—Scott A. Rogers
Attorney, Agent, or Firm—Nixon & Vanderhye

[57] ABSTRACT

Here is disclosed a printer which, in an image mode of a standard resolution, decodes encoded image data of one line and executes printing on recording paper (22) twice based on the decoded image data. This printer can be applied to a facsimile apparatus. Such a printer comprises a detector (12) which detects whether the decoding has been completed up to the midpoint of each line. At the same time that the decoding of one line is started, a first printing is started based on other already decoded data, and at the same time that the completion of decoding up to the midpoint is detected, a second printing is started. Each time the first or the second printing is completed, the recording paper (22) is conveyed by a pulse motor (18) by a predetermined amount by the beginning of the subsequent printing. Therefore, irregularities in the printing operation and conveyed amount of the recording paper (22) can be diminished.

8 Claims, 4 Drawing Sheets

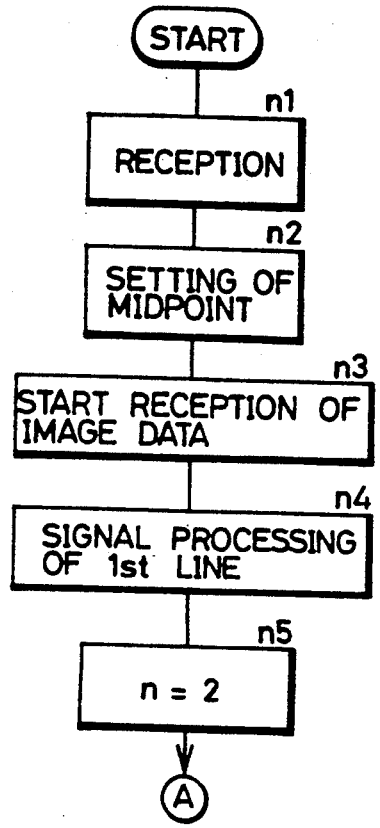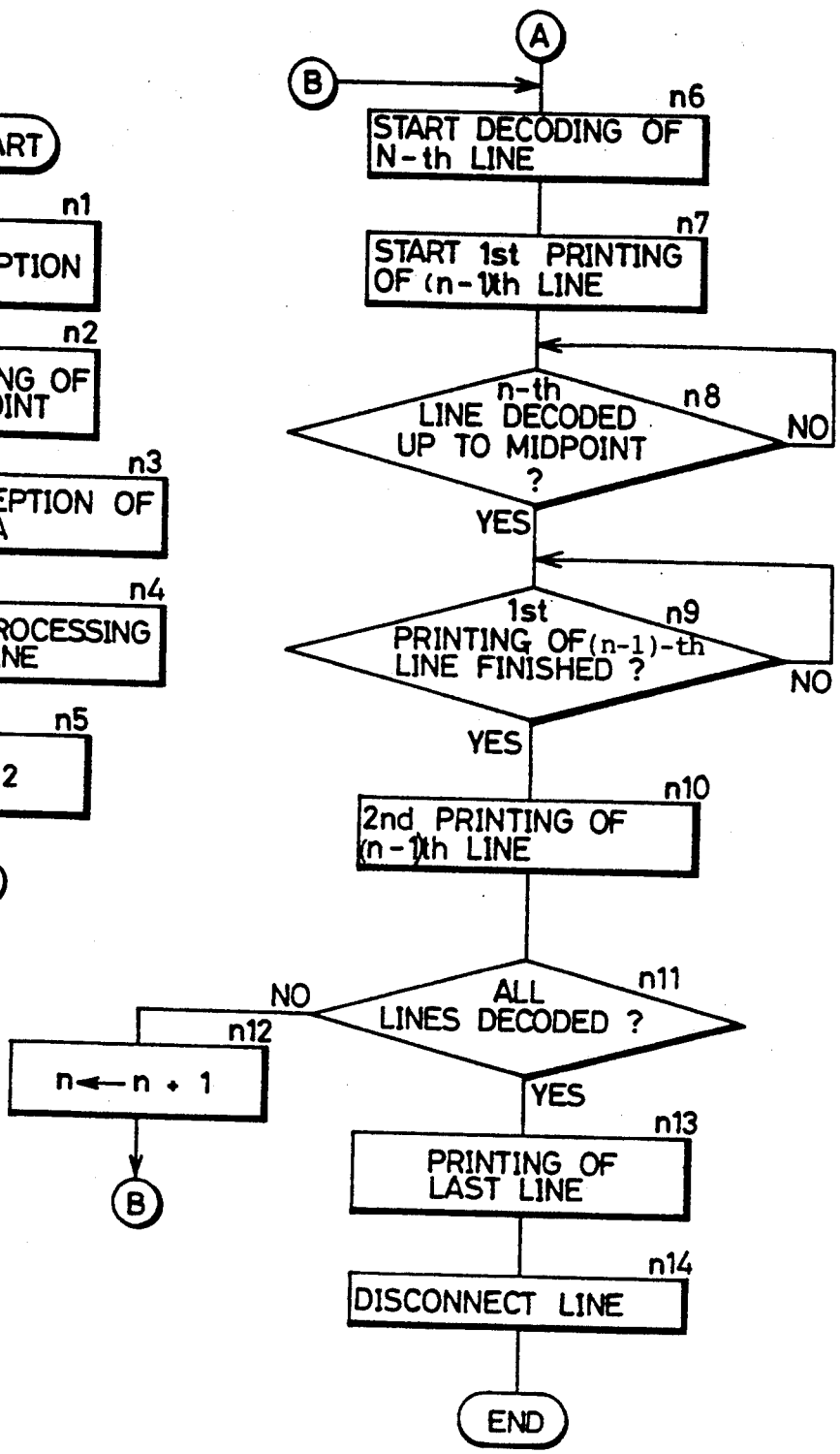

PRINTER CAPABLE OF PRINTING AT REGULAR TIME INTERVALS

BACKGROUND OF THE INVENTION

1. Field of the Invention

The present invention generally relates to printers, and more particularly, to a printer capable of printing at regular time intervals.

2. Description of the Background Art

A facsimile apparatus is generally provided with a linear thermal head which thermosensitively records image data transmitted from another facsimile apparatus on thermosensible paper or the like. Such a linear thermal head comprises a plurality of heating elements which are arranged in a line and selectively heated based on printing data.

A facsimile apparatus in general transmits image data according to a telecommunication system standardized by the CCITT (International Telegraph and Telephone Consultative Community). For example, in a telecommunication system standardized by the CCITT as "G III", there are provided a telecommunication mode called "standard mode" for standard image data and another mode called "fine mode" which enables transmission of high definition image data.

FIG. 4 is an illustration for explaining printing operation of a facsimile apparatus in the fine mode. As shown in FIG. 4, a printing head of the facsimile apparatus has a plurality of heating elements Hj (j=1, 2, ..., n) arranged thereon, above which recording paper 22 is fed in the direction of arrow 21. The heating elements Hj have a width of L1 in the feeding direction 21 of the recording paper 22. When a one-line printing is completed by the heating elements Hj, the recording paper 22 is conveyed only by the width L1. In the fine mode, therefore, lines 11 and 12 each having the width L1 are printed based on image data corresponding to the lines 11 and 12.

FIG. 5 is an illustration for explaining printing operation of a facsimile apparatus in the standard mode. In the standard mode, one line 13 has a width of L2 twice the width L1. Accordingly, the heating elements Hj of the width L1 can not accomplish printing of the one line 13 at a time, so that two printing operations are performed based on image data for the one line. Therefore, a printing operation in an area indicated by reference character 13a and another printing operation in an area indicated by reference character 13b are performed separately.

FIG. 6 is a timing chart for explaining printing operation of a facsimile apparatus in the standard mode, which is taken as a background art of the present invention. In the standard mode, after received image data of one line are decoded, printing is executed twice based on those one-line image data. For example, as shown in FIG. 6 (1), when the n-th line image data are decoded during a period W1, upon start of the decoding of this n-th line image data, the first printing of the (n−1)-th line is started.

As shown in FIG. 6 (2), the first printing of the (n−1)-th line is executed during a period W2, and upon completion of this first printing, the second printing of the (n−1)-th line is executed during a period W3. After a period of W4 has passed since the completion of the second printing, decoding of the (n+1)-th line image data is started, and at the same time, the first printing of the n-th line image data that have been decoded during the period W1 is also started, followed by the second printing.

According to the printing system employed in the facsimile apparatus above in the standard mode, when the first printing of the (n−1)-th line is completed, recording paper is conveyed only by a width L1. At this time, a plurality of control signals are selectively switched in their level and applied to a pulse motor for conveying the recording paper so as to rotate the motor only by a certain angle. In practice, however, it takes several milliseconds for the pulse motor to be rotated only by a certain angle on reception of such signals, and stop. Accordingly, the recording paper has not been conveyed enough when the second printing of the (n−1)-th line is started. In addition, during the period W4 between the completion of the second printing for the (n−1)-th line and the beginning of the subsequent printing for the n-th line, the printing paper is only conveyed but no printing operation is performed thereon. Therefore, the first printing is executed after the recording paper has been conveyed enough to accept the subsequent printing. Furthermore, since the period W4 is a relatively long time, when compared with a time interval between the time $t_2$ when the recording paper is conveyed for the second printing of the (n−1)-th line and the time $t_3$ when the same is conveyed for the first printing of the n-th line, another time interval between the time $t_3$ and the time $t_4$ when the recording paper is conveyed for the second printing of the n-th line is longer. This means that the recording paper is conveyed at timings where a short and a long idle periods appear alternately. The facsimile apparatus that has been taken as a background art of the present invention has, therefore, a problem that irregularities in amount and timings of feeding the recording paper in the printing operation deteriorate printing quality.

SUMMARY OF THE INVENTION

An object of the present invention is to provide a printer which can offer improved printing quality.

Another object of the present invention is to diminish the irregularities in amount of conveyed recording paper in a printer.

According to an aspect of the present invention, encoded image data of one line are decoded for each line. The decoded data are printed twice in each line on recording paper. The first and second printings for each line are controlled to be executed at regular time intervals.

According to another aspect of the present invention, after the first printing of one line is completed and before the second printing is started, and also after the second printing of the line is completed and before the first printing for the subsequent line is started, the recording paper is conveyed only by a predetermined amount.

According to still another aspect of the present invention, immediately after the decoding of image data for one line is started, the first printing of already decoded other image data is started for another line, and when it is detected that the decoding has been completed only for the first half of the image data and when the first printing is completed, the recording paper is conveyed by a predetermined amount and then the second printing of the already decoded image data is started.

According to the present invention, the first and second printing operations for each line can be performed at regular time intervals without overlapping the operation of conveying the recording paper. Accordingly, the irregularities in amount of the conveyed recording paper and in printing operation can be diminished, considerably enhancing the printing quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are flow charts for explaining operation of the facsimile apparatus shown in FIG. 1.

DESCRIPTION OF THE PREFERRED EMBODIMENTS

Figure 1:
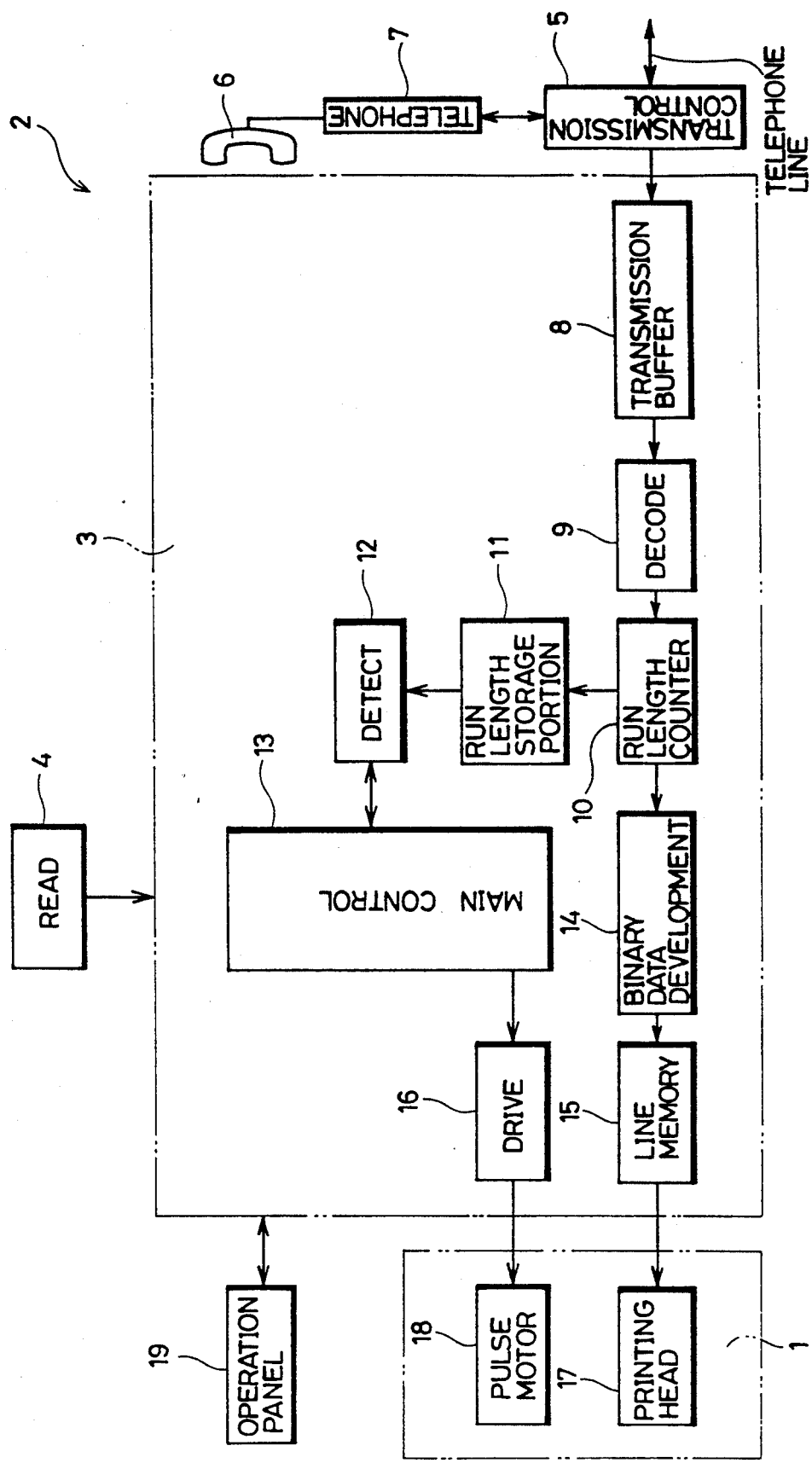
FIG. 1 is a block diagram showing a facsimile apparatus according to an embodiment of the present invention.

Referring to FIG. 1, structure and operation of a facsimile apparatus 2 according to an embodiment of the present invention will be described. The facsimile apparatus 2 comprises signal processing means 3, printing means 1, an operation panel 19, a reading unit 4, and a transmission control circuit 5, and transmits image data through a telephone line L.

When an original image is read out in the facsimile apparatus 2 to be transmitted through the telephone line L, the original image is read out by a one-dimensional image sensor (not shown) or the like in the reading unit 4 and outputted to the signal processing means 3 as image information. The signal processing means 3 encodes the image information through processing such as data compression and outputs the encoded data to the transmission control circuit 5. The transmission control circuit 5 modulates the encoded signals for transmission to the telephone line L. The original image read out by the reading unit 4 in this manner is transmitted to a destination facsimile apparatus through the telephone line L.

When image information from another facsimile apparatus is received in the facsimile apparatus 2, the image information from the telephone line L is received by the transmission control circuit 5 and demodulated before applied to the signal processing means 3. This transmission control circuit 5 is provided with a telephone 7 and a handset 6 for implementing telephone function.

The signal processing means 3 is constituted as comprising a decoding circuit 9 as decoding means for decoding encoded image data, a run length counter 10, a run length storage portion 11 and a detecting circuit 12 for detecting that the first half image data of one line have been decoded, and a main control circuit 13. The image data demodulated by the transmission control circuit 5 are applied to a transmission buffer 8 to be temporarily stored therein. The decoding circuit 9 decodes the image data stored in the transmission buffer 8 for every one line and outputs the decoded data to the run length counter 10. The image data have been MH-encoded, and when a plurality of picture elements to be printed in the same manner had appeared in succession, the image data have been compressed to be encoded. The run length counter 10 counts number of the compressed picture elements.

Output of the run length counter 10 is applied to the run length storage portion 11 and also to binary data developing means 14. The run length storage portion 11 operates, based on the output from the run length counter 10, number of the picture elements in each line that have undergone decoding, and stores the results. The number of picture elements is compared with a midpoint set by the detecting circuit 12 as will be described later, the result of which is outputted to the main control circuit 13. The midpoint is obtained by dividing the number of picture elements contained in one line by 2.

The binary data developing means 14 develops, the output signals of the run length counter 10 into data of binary level each corresponding to printing/non-printing in each picture element, which are outputted to a line memory 15. The line memory 15 stores the binary data of one line and outputs the same to a printing head 17 for each line.

The printing head 17 is provided with a plurality of heating elements as will be described later. The heating elements are selectively heated, based on the binary data, to execute a printing on thermosensible paper. A pulse motor 18 as conveying means for conveying recording paper is driven by a driving circuit 16, based on control signals from the main control circuit 13. Recording means 1 is constituted as comprising the printing head 17 and the pulse motor 18.

This facsimile apparatus 2 can transmit image data according to the telecommunication system G III that has been standardized by the CCITT. In the facsimile apparatus 2, therefore, there are provided two telecommunication modes. That is, the standard mode for standard image data and the fine mode which enables transmission of high definition image data.

Figure 4:
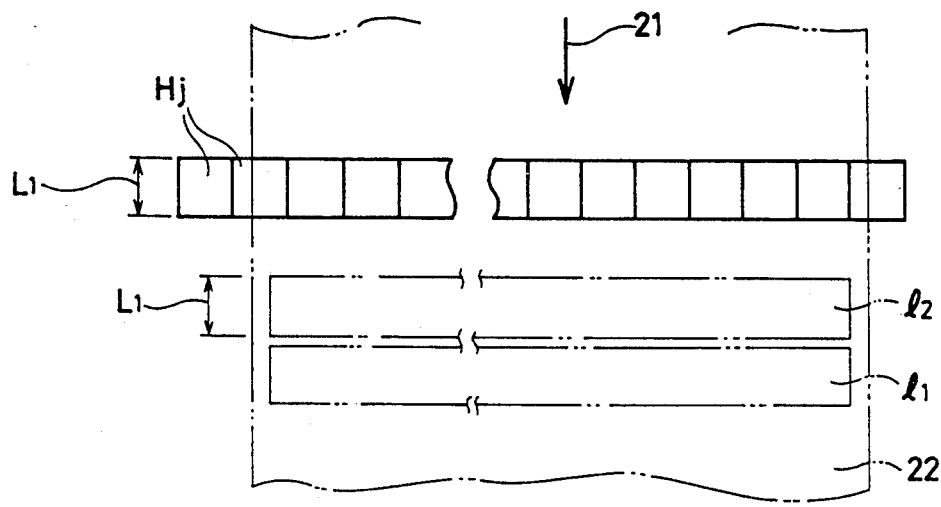
FIG. 4 is an illustration for explaining operation of a facsimile apparatus in the fine mode, which is taken as a background art of the present invention.

In the fine mode transmission, as shown in FIG. 4, the printing head 17 has a plurality of heating elements Hj (j=1, 2, ..., n) arranged thereon, above which recording paper 22 is conveyed in the direction of arrow 21. The heating elements Hj have a width of L1 in the conveying direction 21 of the recording paper 22. When printing of one line is completed by the heating elements Hj, the recording paper 22 is conveyed in the direction of arrow 21 only by the width L1. In the fine mode, therefore, lines l1 and l2 each having the width L1 are printed, based on image data corresponding to the lines l1 and l2, respectively. The width L1 is, for example, 1/3.85 mm.

Figure 5:
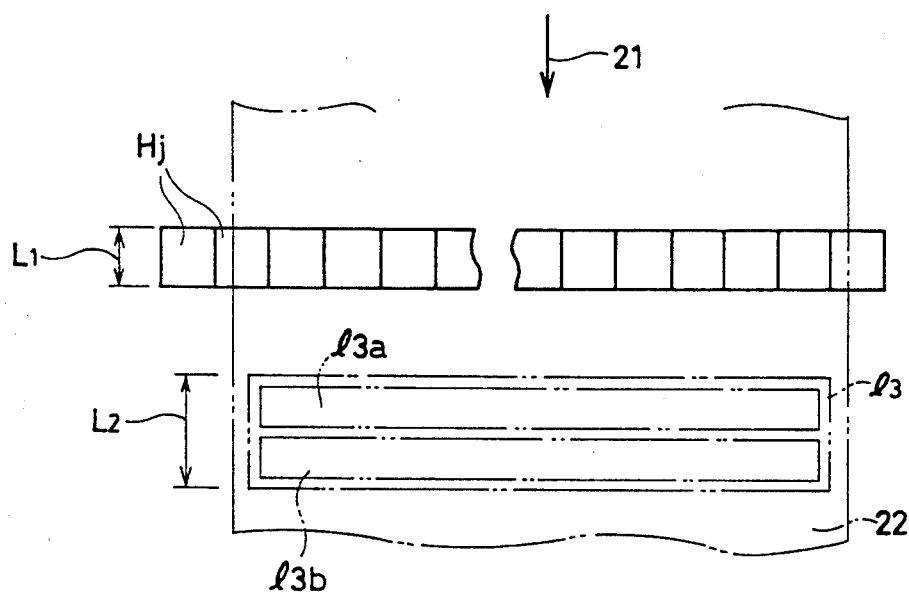
FIG. 5 is an illustration for explaining operation of a facsimile apparatus in the standard mode, which is applied to the present invention and take as a background art of the present invention.

In the standard mode, as shown in FIG. 5, one line l3 has a width of L2 twice the width L1. Accordingly, the heating elements Hj of the width L1 can not print the one line l3 at a time, so that printing operation is performed twice based on image data corresponding to the one line. More specifically, the first printing operation for an area indicated by reference character 13a and the second printing operation for another area indicated by reference character 13b are performed separately. Generally, the two printing operations above are performed to print the same image pattern. In the two printing operations, however, an image pattern corresponding to the received image data and another interpolated image pattern may be printed, respectively.

In the following, referring to the flow charts of FIGS. 2A and 2B, receiving and printing operations of the facsimile apparatus 2 in the standard mode will be described. At step n1, reception of data is detected in association with a transmitting operation of another facsimile apparatus, allowing connection of the telephone line L. At step n2, information of an original such as size is received prior to reception of image data. In the facsimile apparatus 2, an operation mode is set in accordance with the original size based on these data. At this time, a midpoint is set corresponding to each operation mode.

In the case of an A4-size original, for example, an operation mode is set to allow selective heating of 1,728 heating elements (number of the heating elements is 1,728 in the lateral direction of FIG. 5) and thus the midpoint is set to 864. Further, in the case of B4-size original, an operation mode is set to allow selective heating of 2,048 heating elements (number of the heating elements is 2,048 in the lateral direction of FIG. 5) and thus the midpoint is set to 1024.

At step n3, the reception of the image data is started and at step n4, decode processing of the first line is first performed. At step n5, n is initialized to 2 and at step n6, decode processing of the n-th line is started, while at step n7, the first printing of the (n−1)-th line is started. Thereafter, the decode processing and the printing operation are performed in parallel.

At step n8, it is determined whether the decode processing on the n-th line has been completed up to the midpoint or not. If the determination is negative, the decode processing or the printing operation is continued. If the determination is affirmative, the operation enters step n9 where it is determined whether the first printing for the (n−1)-th line has been completed or not. If the determination is negative, the printing operation or the decode processing is continued. If this determination is affirmative, the operation enters step n10 where the second printing for the (n−1)-th line is executed.

Generally, when the decode processing up to the midpoint of the n-th line is completed, the first printing operation for the (n−1)-th line has been already completed as will be described later. Upon completion of this first printing operation, recording paper is conveyed as an interruption handling. After several milliseconds have passed since output of a signal for rotating the pulse motor 18 by a predetermined angle, therefore, the second printing operation for the (n−1)-th line is started. This enables the recording paper to be conveyed by a sufficient amount to accept the second printing of the (n−1)-th line.

Upon completion of the second printing, the recording paper is conveyed by a predetermined amount, and at step n11, it is determined whether the decode processing has been completed over the entire line. If the determination is negative, value of n is incremented at step n12 and the operation returns to the step n6 above to repeat the same procedure. If the determination at step n11 is affirmative, the operation enters step n13 where the second printing for the last line is executed. Upon completion of the printing operation at step n13, the recording paper is conveyed by a predetermined amount, and at step n14, the telephone line L is disconnected to terminate the receiving and printing operations.

Figure 3:
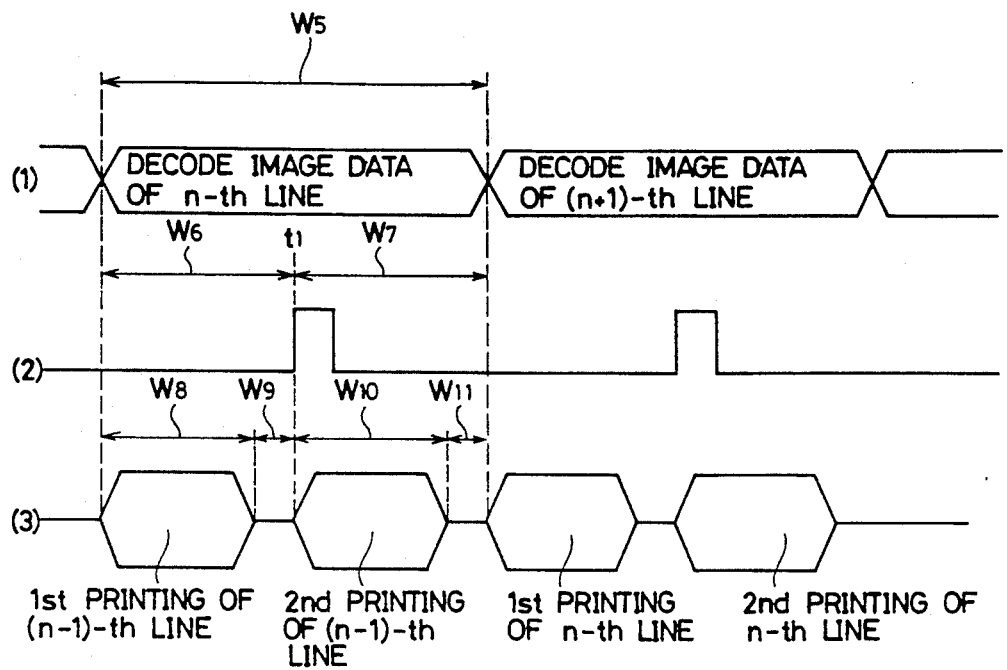
FIG. 3 is a timing chart for explaining operation timings of the facsimile apparatus shown in FIG. 1.
Figure 6:
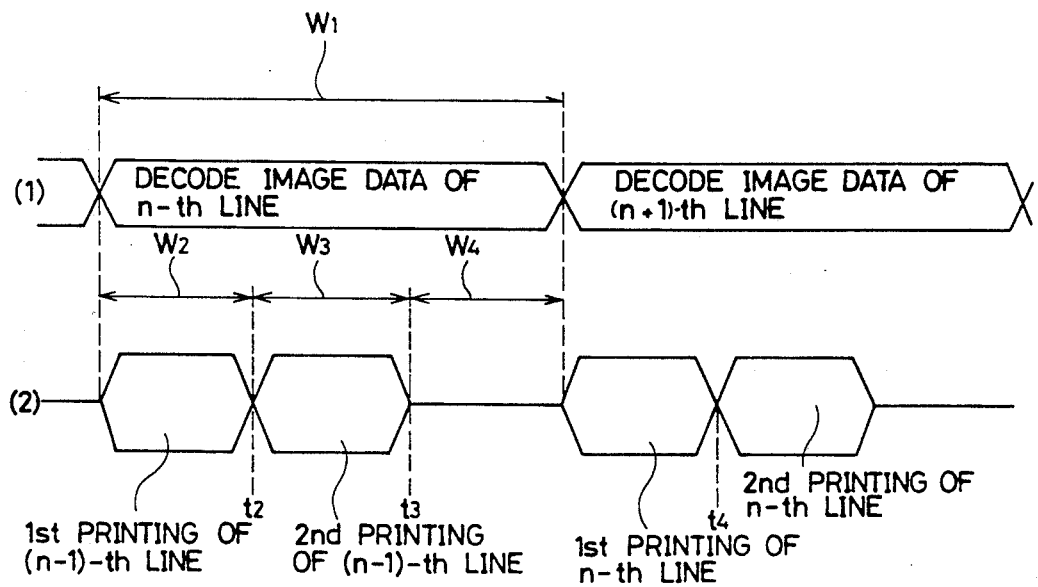
FIG. 6 is a timing chart for explaining operation of a facsimile apparatus in the standard mode, which is taken as a background art of the present invention.

FIG. 3 is a timing chart for explaining timings of the decode processing and the printing operation of the facsimile apparatus 2 in the standard mode. As shown in FIG. 3 (1), image data of the n-th line are decoded during a period W5. At the same time that the decoding of image data in the n-th line is started, the first printing operation for the (n−1)-th line is started and continued until the end of a period W8. When the decode processing of image data up to the midpoint in the n-th line is completed at the end of a period W6, the completion of the decode processing of image data up to the midpoint is detected by the detecting circuit 12 to allow application of a signal rising at the time t1, as shown in FIG. 3 (2), to the main control circuit 13. The main control circuit 13 is responsive to this signal to allow an interruption handling, and starts the second printing operation for the (n−1)-th line.

Timing of the printing operation is shown in FIG. 3 (3). The second printing for the (n−1)-th line is executed during a period W10. In general, the time period W6 taken for decoding the image data from the first picture element to the midpoint in one line becomes substantially equal to a period W7 taken for decoding the image data from the midpoint to the last picture element in the same line. Further, the period W8 required for the first printing is substantially equal to the period W10 for the second printing in each line. Accordingly, a period W9 between the completion of the first printing operation and the beginning of the second printing operation in one line and a period W11 between the completion of the second printing operation and the beginning of the first printing operation in the subsequent line are substantially equal. The pulse motor for conveying the recording paper receives drive signals at the end of the periods W8 and W10 to be actually rotated in angle by a predetermined amount during the periods W9 and W11 and then stopped. Therefore, each printing operation is performed after the recording paper is conveyed precisely by a predetermined amount.

Thus, according to the present embodiment, in the standard mode printing, the first and second printing operations for each line can be preformed intermittently at regular time intervals. Therefore, the pulse motor for conveying recording paper can convey the recording paper with high precision for each printing operation. In this manner, the deterioration of printing quality attributable to irregular conveyance of the recording paper can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printer which executes printing on recording paper, based on image data encoded for a plurality of lines, comprising:

decoding means for decoding the encoded image data of one line for each line;

monitor means for monitoring the advancement of the decoding of said encoded image data of said one line;

printing means for printing the data decoded by said decoding means on said recording paper in first and second printing operations for each line;

conveying means for conveying said recording paper by a predetermined amount each time the first or the second printing operation for each line is completed by said printing means; and control means, responsive to said monitor means, for starting the first printing operation for a line already decoded in response to the start of decoding by said decoding means and for starting the second printing operation for said already decoded line in response to said monitor means detecting that decoding of said one line has advanced to a predetermined degree.

2. The printer according to claim 1, wherein said control means controls the printer such that after said recording paper has been conveyed by said conveying means by said predetermined amount, either the first or the second printing operation is executed by said printing means.

3. A printer which decodes encoded image data of one line and executes printing on recording paper twice based on the decoded image data of the one line, comprising:

decoding means for decoding the encoded image data for each line;

detecting means for detecting that decoding of the first half image data of one line has been completed;

printing means for printing, based on the data decoded by said decoding means;

conveying means for conveying said recording paper prior to the first or the second printing for each line by said printing means; and control means for controlling the printer such that immediately after decoding of the image data of one line is started, the first printing for another already decoded line is started, and after said recording paper is conveyed following the detection by said detecting means that the first half decoding of said one line has been completed and the completion of the first printing by said printing means, the second printing of said already decoded line is started.

4. The printer according to claim 3, wherein said printing means comprises heating elements (Hj) for thermosensitive recording.

5. A printer in accordance with claim 1, wherein the time period between the start of the decoding of said one line and the detection of the advancement of the decoding to said predetermined degree is greater than the sum of the time required for the first printing operation or the second printing operation and the time required for conveying the recording paper by one line.

6. A printer in accordance with claim 1, wherein the time period between the start of decoding of said one line and the advancement of the decoding to said predetermined degree is set to be one half the time required to decode the image data of said one line.

7. A printer in accordance with claim 1, wherein the time period between the start of decoding of said one line and the advancement of said decoding to said predetermined degree is set based upon a count of half the pixels to be included in one line.

8. A printer in accordance with claim 1, wherein said printing means comprises heating elements for thermosensitive recording.

* * * * *